United States Patent [19]

Suzuki et al.

[11] Patent Number: 5,204,787
[45] Date of Patent: Apr. 20, 1993

[54] TIME BASE CORRECTING APPARATUS WITH MEANS FOR INHIBITING MEMORY WRITE AND READ ADDRESSES TO PREVENT ADDRESS OVERLAP

[75] Inventors: Yoshinori Suzuki; Yuji Nakamura, both of Kanagawa, Japan

[73] Assignee: Sony Corporation, Tokyo, Japan

[21] Appl. No.: 617,878

[22] Filed: Nov. 26, 1990

[30] Foreign Application Priority Data

Nov. 28, 1989 [JP] Japan .................................. 1-308069

[51] Int. Cl.$^5$ .............................................. H04N 5/78
[52] U.S. Cl. .................................. 360/36.1; 360/10.1; 358/337
[58] Field of Search ..................... 360/36.1, 10.1, 10.2, 360/10.3, 33.1, 34.1; 358/337

[56] References Cited

U.S. PATENT DOCUMENTS

| | | | |
|---|---|---|---|
| 3,860,952 | 1/1975 | Tallent et al. | 358/19 |
| 4,063,284 | 12/1977 | Tatami | 358/127 |
| 4,134,131 | 1/1979 | Hopkins, Jr. | 358/149 |
| 4,389,678 | 6/1983 | Mizukami et al. | 360/10.3 |
| 4,731,659 | 3/1988 | Kani | 360/10.1 X |
| 4,733,312 | 3/1988 | Morimoto | 360/36.1 X |
| 4,743,979 | 5/1988 | Okano et al. | 360/10.1 X |
| 4,788,604 | 11/1988 | Takeuchi | 360/10.3 |

OTHER PUBLICATIONS

Patent Abstracts of Japan vol. 6, No. 211 (E-137) Oct. 23, 1982 & JP-A-57 116 485 (Hitachi Denshi KK) Jul. 20, 1982 Time-Axis Correcting Device.

*Primary Examiner*—Andrew L. Sniezek
*Attorney, Agent, or Firm*—William S. Frommer; Alvin Sinderbrand

[57] ABSTRACT

In a time base correcting apparatus having a memory for storing a reproduced video signal reproduced by a rotary magnetic head from slant tracks on a magnetic tape which is transported at a desired tape running speed that may be different from a tape running speed used when recording the video signal on the tape, a write in-line address counter for generating a write in-line address signal and a write line address counter for generating a write line address signal supplied to the memory, a write clock signal generating circuit for generating a write in-line address increment clock signal and a write line address increment clock signal which are each synchronized with a reproduced horizontal synchronizing signal separated from the reproduced video signal, and which are supplied to the write in-line address counter and the write line address counter, a read in-line address counter for generating a read in-line address signal and a read line address counter for generating a read line address signal supplied to the memory, and a read clock signal generating circuit for generating a read in-line address increment clock signal and a read line address increment clock signal which are each synchronized with a reference horizontal synchronizing signal, and which are supplied to the read in-line address counter and to the read line address counter: periodically recurring signal sequences which are respectively synchronized with the reproduced horizontal synchronizing signal and the reference horizontal synchronizing signal, are generated, coincidence of a signal in one of the sequences with a corresponding signal in the other of the sequences is detected, and, in response to such detection, changing of one of the write line address signal and the read line address signal from the address counter and the read line address counter respectively, is inhibited.

3 Claims, 5 Drawing Sheets

TIME BASE CORRECTING APPARATUS WITH MEANS FOR INHIBITING MEMORY WRITE AND READ ADDRESSES TO PREVENT ADDRESS OVERLAP

BACKGROUND OF THE INVENTION

1. Field of the Invention

The present invention generally relates to a time base correcting apparatus and, more particularly, to a time base correcting apparatus for time-base-correcting a reproduced video signal reproduced by a rotary magnetic head from oblique tracks on a magnetic tape which is transported at a desired running speed that may be different from a tape running speed used when recording a video signal on the magnetic tape.

2. Description of the Prior Art

A conventional time base correcting apparatus of, for example, a BETACAM type VTR (video tape recorder) includes a memory into which a reproduced video signal (a luminance signal or color difference signals) reproduced from slant tracks on a magnetic tape by a rotary magnetic head is written or from which the same is read out. The time base correcting apparatus is further provided with a write in-line address counter for generating a write in-line address signal and a write line address counter for generating a write line address signal supplied to the memory, and a write clock signal generating circuit for generating a write in-line address increment clock signal and a write line address increment clock signal which are each synchronized with a reproduced horizontal synchronizing signal separated from the reproduced video signal. These signals are supplied to the write in-line address counter and the write line address counter, respectively. The time base correcting apparatus is also provided with a read in-line address counter for generating a read in-line address signal and a read line address counter for generating a read line address signal supplied to the memory, and a read clock signal generating circuit for generating a read in-line address increment clock signal and a read line address increment clock signal which are each synchronized with a reference horizontal synchronizing signal and are supplied to the read in-line address counter and the read line address counter. Thus, a jitter component (time base error) of the reproduced video signal is corrected.

The write clock signal and the write line address signal include the jitter component of the reproduced video signal, whereas the read clock signal and the read line address signal are each synchronized with the reference horizontal synchronizing signal so that while the read line address signal is generated at a constant speed, the write line address signal varies in accordance with the reproducing speed of the VTR. As a result, in a variable speed reproduction mode of the VTR, that is, a mode wherein reproduction is performed at a tape speed different from that used when recording a video signal on a magnetic tape, the write and read line address signals for the memories will frequently coincide with each other or overlap, so that the reproduced video signal cannot be correctly written in and read-out from the memory.

Heretofore, coincidence or overlapping of the write and read address signals has been avoided by the method discussed below with reference to FIGS. 1 and 2.

Figure 1:
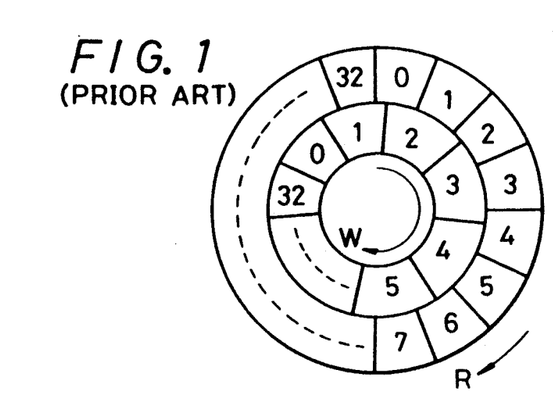
FIG. 1 is a schematic diagram used to explain a problem in the prior art in which the addresses of write and read address signals coincide in the forward variable speed reproduction mode.

FIG. 1 diagrammatically shows an address arrangement of the write and read line address signals which are shown in sectors of inner and outer rings. These signals are used in the FWD (forward direction) variable speed reproduction mode and are supplied to a memory in which a video signal of, 32 line periods, for example, can be stored. In the FWD variable speed reproduction mode, the cycle of the horizontal synchronizing signal in the reproduced video signal becomes longer than that of the reference horizontal synchronizing signal so that the cycle of the write line address signal becomes longer than that of the read line address signal. Thus, as shown in FIG. 1, in the addresses behind address 3, for example, the addresses of write and read line address signals become coincident with each other. Therefore, in such event, n (integer) lines previously written in the memory are read out again so that the addresses of the signals do not coincide with each other.

Figure 2:
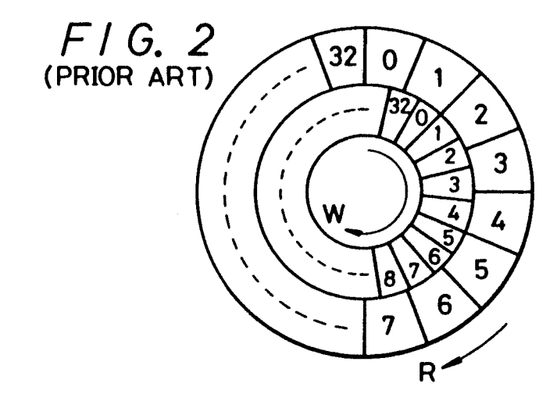
FIG. 2 is a schematic diagram used to explain a problem in the prior art in which the addresses of write and read address signals coincide in the reverse variable speed reproduction mode.

Similarly to FIG. 1, FIG. 2 shows an addresses arrangement of the write and read line address signals in the REV (reverse direction) variable reproduction mode.

In the REV variable speed reproduction mode, since the cycle or the horizontal synchronizing signal in the reproduced video signal becomes shorter than that of the reference horizontal synchronizing signal, the cycle of the write line address signal becomes shorter than that of the read line address. signal. Therefore, as shown in FIG. 2, in the addresses behind address 3, for example, the addresses of write and read line address signals become coincident with each other. Then, in such event, n (integer) lines written in the memory are read out before the present line, so that the addresses of the signals do not coincide with each other.

A time base correcting apparatus in which the write address does not coincide with the read address is disclosed in Japanese Patent Laid-Open Gazette No. 52-10022.

Because a conventional time base correcting apparatus is configured to reproduce a video signal which is, for example, sixteen horizontal periods ahead of the reference horizontal synchronizing signal, in the normal reproduction mode at a normal speed and in the FWD or REV variable speed reproduction mode at a speed slightly higher than the normal speed, addresses of write and reac address signals do not substantially coincide. By contrast, if the FWD and REV variable reproduction speeds become considerably higher than the normal speed, the addresses of the write and read address signals will eventually coincide. Further, since the reproduced video signal is sixteen horizontal periods ahead of the reference horizontal synchronizing signal, in the variable speed reproduction mode the addresses of the address signals do not coincide with each other at the upper area of a picture. However, in the lower area of a picture, the addresses of the address signals coincide with each other so that the above mentioned switching of read address lines is performed just before the reproduction of the lower area of the picture starts.

Accordingly, in the conventional time base correcting apparatus, a video signal is written in and read out from the memory correctly in a high variable speed reproduction mode, whereby the video signal can be reproduced as a video image on a monitor receiver.

However, the conventional time base correcting apparatus in which the video signal in the variable playback mode can be reproduced as a video image encounters the problems of so-called "picture contraction" and "picture expansion".

Figure 3:
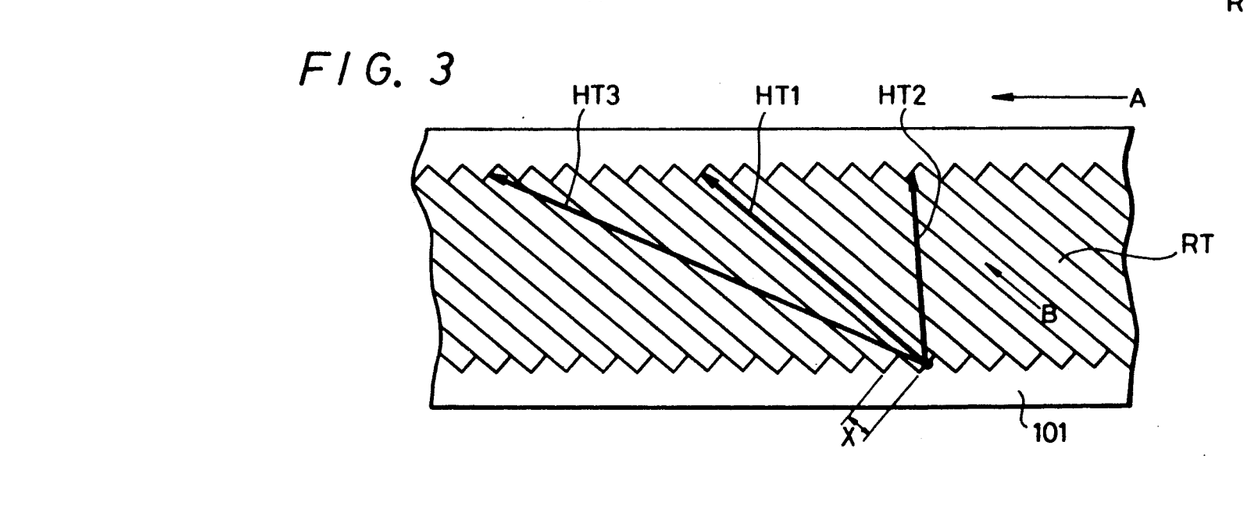
FIG. 3 is a diagrammatic view of a section of a magnetic tape used to illustrate record tracks thereon in which a video signal is recorded by a BETACAM type video tape recorder.

A fundamental principle of picture contraction and picture expansion will now be explained with reference to FIG. 3, which is a diagrammatic view of a section of a magnetic tape. In FIG. 3, reference numeral 101 designates a magnetic tape, and reference letters RT designate record tracks in which a video signal is recorded on the magnetic tape by a Betacam type video tape recorder (VTR). An arrow A represents a tape running direction in the forward reproduction mode and an arrow B represents the direction of reproducing head movement. Further, reference numeral HT1 represents a locus of the head in the normal reproduction mode, HT2 represents a locus of the head in the fast-forward reproduction mode and HT3 represents a locus of the head in the reverse reproduction mode. A cross mark X represents an alignment difference between the adjacent record tracks RT in the longitudinal direction of the track.

Figure 4:
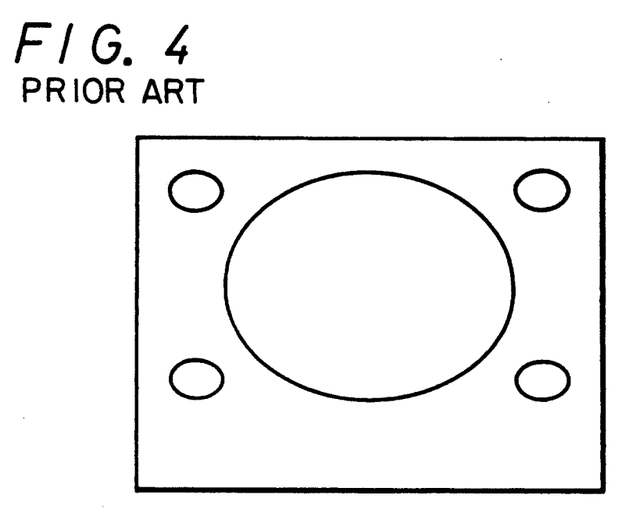
FIG. 4 is a schematic diagram of a video image reproduced on a picture screen of a monitor receiver in the forward variable speed reproduction mode, and to which reference will be made in explaining the problem of so-called "picture contraction"
Figure 5:
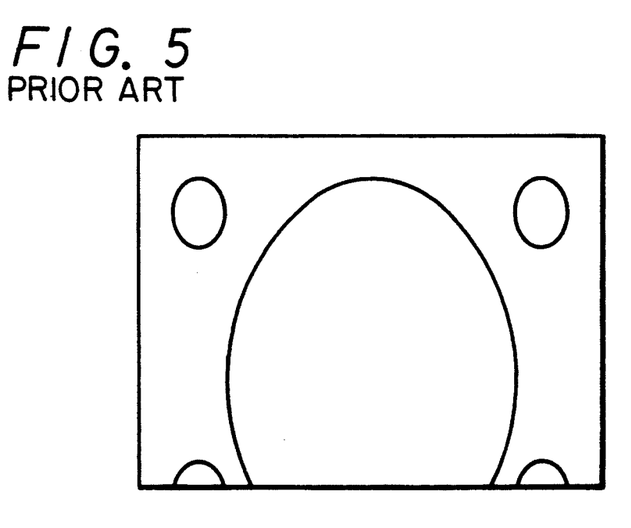
FIG. 5 is a schematic diagram of a video image reproduced on a picture screen of a monitor receiver in the reverse variable speed reproduction mode, and to which reference will be made in explaining the problem of so-called "picture expansion"

Incidentally, the rotational speed of the rotary head is made constant so that, in either the normal reproduction mode, the fast-forward reproduction mode or the reverse reproduction mode, the time required by the rotary head to move from the starting portion to the ending portion of each of the head loci HT1, HT2 and HT3 is equal. As shown in FIG. 3, since the track alignment difference X exists between the adjacent record tracks RT, the information amount of the head locus HT2 becomes smaller than the information amount involved in the head locus HT1 in the normal playback mode, and the information amount of the head locus HT3 becomes larger than the information amount of the head locus HT1 in the normal reproduction mode. As a result, as earlier noted, the cycle of the horizontal synchronizing signal of the reproduced video signal in the forward reproduction mode becomes longer than that of the reference synchronizing signal, whereas the cycle of the horizontal synchronizing signal of the reproduced video signal in the reverse reproduction mode becomes shorter than that of the reference synchronizing signal. If such a reproduced video signal is written in a memory in line units in accordance with the write line address signal and is read out from the memory in lines units in accordance with the read line address signal, the number of lines read-out during one cycle period (one field period) of the reference vertical synchronizing signal is constant. Therefore, with respect to the reproduced video signal obtained from the head moving along the locus HT2 in the fast-forward reproduction mode, information from the starting portion to the ending portion of the head locus HT2 is read out. However, with respect to the reproduced video signal obtained when moving along the head locus HT3 in the reverse reproduction mode, only the lines of one field period traversed by the starting end portion of the head locus are read out, and the remaining lines of that one field period will not be read. Consequently, as shown on FIG. 4, a circle in the normal reproduction mode is reproduced in the fast-forward reproduction mode as an ellipse elongated in the horizontal direction, that is, so-called "picture contraction" occurs. In the reverse reproduction mode, a circle in the normal reproduction mode is reproduced as an ellipse elongated in the vertical direction which has its lower portion "dropped out", that is, so-called "picture expansion" occurs, as shown in FIG. 5. The degree of "picture contraction" or "picture expansion" depends on the tape speed in the fast-forward or reverse reproduction mode.

Furthermore, the use of a conventional time base correcting apparatus for avoiding overlapping or coincidence of reading and writing addresses in the lower portion of the picture results in picture distortion, in addition to the problem of "picture expansion".

OBJECTS AND SUMMARY OF THE INVENTION

Accordingly, it is an object of the present invention to provide an improved time base correcting apparatus which can substantially eliminate the aforenoted shortcomings and disadvantages encountered with the prior art.

More specifically, it is an object of the present invention to provide a time base correcting apparatus in which a picture can be reproduced without distortion regardless of the running speed and running direction of a magnetic tape having slant tracks on which the reproduced video signal is recorded and from which the same is reproduced by a rotary magnetic head.

According to an aspect of the present invention, a time base correcting apparatus includes a memory for storing a reproduced video signal reproduced by a rotary magnetic head from slant tracks on a magnetic tape which is transported at a desired tape running speed that may be different from a tape running speed used when recording the video signal on the tape, a write in-line address counter for generating a write in-line address signal and a write line address counter for generating a write line address signal supplied to the memory, a write clock signal generating circuit for generating a write in-line address increment clock signal and a write line address increment clock signal which are each synchronized with a reproduced horizontal synchronizing signal separated from the reproduced video signal and which are supplied to the write in-line address counter and the write line address counter, a read in-line address counter for generating a read in-line address signal and a read line address counter for generating a read line address signal supplied to the memory, and a read clock signal generating circuit for generating a read in-line address increment clock signal and a read line address increment clock signal which are each synchronized with a reference horizontal synchronizing signal and which are supplied to the read in-line address counter and to the read line address counter, the combination comprising: means for generating periodically recurring signal sequences which are synchronized with the reproduced horizontal synchronizing signal and the reference horizontal synchronizing signal, respectively, a detecting circuit for providing a detected output when a signal in one of the sequences coincides with a corresponding signal in the other of the sequences, and control means for inhibiting changing of one of the write line address signal and the read line address signal from the write line address counter and the read line address counter respectively, in response to the detected output from the detecting circuit.

The above, and other objects, features and advantages of the present invention will be apparent in the following detailed description of an illustrative embodiment when read in conjunction with the accompanying drawings, in which like reference numerals are used to identify the same or similar parts in the several views.

DETAILED DESCRIPTION OF THE PREFERRED EMBODIMENT

An embodiment of a time base correcting apparatus according to the present invention will hereinafter be described in detail with reference to FIGS. 6 to 8. In such case, the present invention is applied to a time base correcting apparatus for use with a BETACAM type video tape recorder.

In this embodiment, an FM (frequency modulated) luminance signal and FM color difference signals reproduced from slant tracks on a magnetic tape by a rotary magnetic head are FM-demodulated and then supplied to two respective time base correcting devices which have the same arrangement.

Figures 6, 6A:
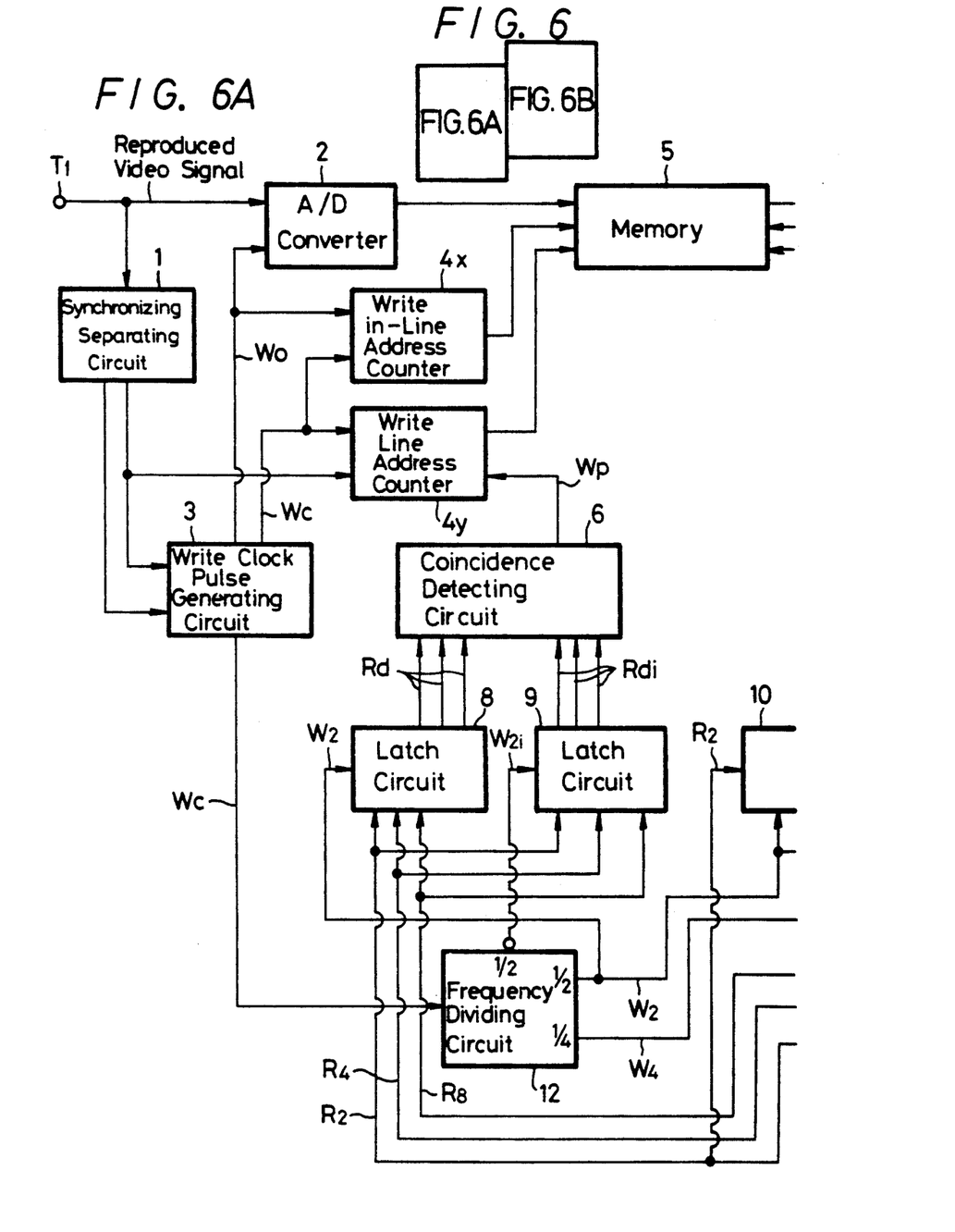
FIG. 6 (comprised of FIGS. 6A and 6B drawn on two sheets of drawings to permit the use of a suitably large scale) is a circuit block diagram showing an embodiment of a time base correcting apparatus according to the present invention.
Figure 6B:
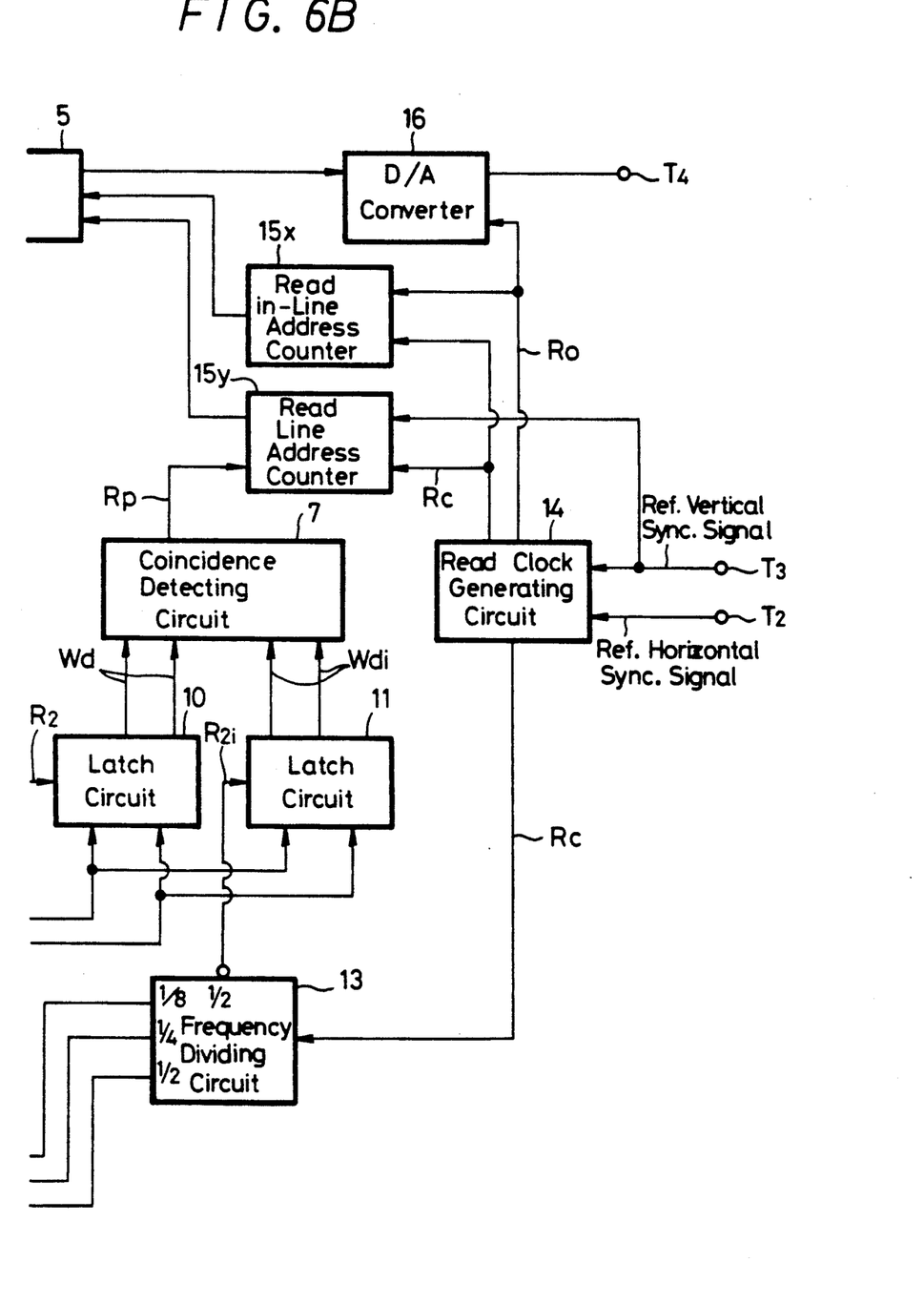

In each of the time base correcting devices, as shown on FIG. 6, a reproduced video signal (luminance signal or color difference signal) applied to an input terminal $T_1$ is supplied therefrom to a synchronizing separating circuit 1 and an A/D (analog-to-digital) converter 2. A write clock pulse generating circuit 3 responds to reproduced horizontal and vertical synchronizing signals from the synchronizing separating circuit 1 to generate a write in-line address increment clock pulse $W_O$ which is synchronized with the reproduced horizontal synchronizing signal and which has a frequency that is, for example, 910 times as high as the frequency of the reproduced horizontal synchronizing signal, and a write line address increment clock pulse $W_C$ which is synchronized with the reproduced horizontal synchronizing signal and which has a frequency that is the same as the frequency of the reproduced horizontal synchronizing signal and whose duty ratio is 50%. The write clock pulse $W_O$ from the write clock pulse generating circuit 3 is supplied to the A/D converter 2 and to a write in-line address counter 4x which will be described later. The clock pulse $W_C$ is supplied to the write in-line address counter 4x, a write line address counter 4y, which will be described later, and a frequency-dividing circuit 12, which will also be later described.

A memory 5 is adapted to store therein a digital video signal of, for example, 32 line periods. The write in-line address counter 4x counts the clock pulse $W_O$ generated from the write clock pulse generating circuit 3 and is reset by the clock pulse $W_C$, thereby to generate an in-line address signal. The write line address counter 4y counts the clock pulse $W_C$ from the write clock pulse generating circuit 3 and is reset by the vertical synchronizing signal separated from the reproduced video signal by the synchronizing separating circuit 1, thereby to generate a line address signal. The in-line and line address signals from the write in-line address counter 4x and the write line address counter 4y, respectively, are supplied to the memory 5, and the digital video signal output from the A/D converter 2 is written into the memory 5 on the basis of these address signals.

A read clock generating circuit 14 responds to reference horizontal and vertical synchronizing signals supplied to input terminals $T_2$ and $T_3$, respectively, to generate an in-line address increment read clock pulse $R_O$ which is synchronized with the reference horizontal synchronizing signal and which has a frequency that is 910 times as high, for example, as the frequency of the reference horizontal synchornizing signal, that is, 14.33 MHz, and a clock pulse $R_C$ which is synchronized with the reference horizontal synchronizing signal and which ahs a frequency that is the same as the frequency of the reference horizontal synchronizing signal and whose duty ratio is 50%. The in-line address increment read clock pulse $R_O$ from the read clock generating circuit 14 is supplied to a D/A (digital-to-analog) converter 16 and a read in-line address counter 15x, which will be later described. The clock pulse $R_C$ is supplied to the read in-line address counter 15x, a read line address counter 15y, which will be later described, and a frequency-dividing circuit 13 which will also be later described. The read in-line address counter 15x counts the in-line address increment read clock pulse $R_O$ from the read clock generating circuit 14 and is reset by the clock pulse $R_C$, thereby to generate an in-line address signal, that is, an address along a horizontal line of a video picture. The read line address counter 15y counts the clock pulse $R_C$ from the read clock generating circuit 14 and is reset by a reference vertical synchronizing signal from the input terminal $T_3$, thereby to generate a line address signal. Then, the address signals from the read in-line address counter 15x and the read line address counter 15y are supplied to the respective memory 5, and the digital reproduced video signal (luminance signal or color difference signal) stored in the memory 5 is read-out on the basis of these address signals. The digital reproduced video signal read out from the memory 5 is then converted into an analog reproduced video signal by the D/A converter 16 and is fed to an output terminal $T_4$.

The frequency-dividing circuit 13 at the read-out side divides the clock pulse $R_C$ from the read clock generating circuit 14 to provide ½-, ¼- and ⅛-frequency-divided signals $R_2$, $R_4$ and $R_8$ which are supplied as data to latch circuits 8 and 9 at the write side of the circuit. The ½-frequency-divided output R2 and an inverted frequency-divided output $R_{2i}$ of opposite phase, also provided by the frequency-dividing circuit 13, are supplied as latch pulses to latch circuits 10 and 11, respectively, at the read-out side. In the latch circuits 8 and 9 at the write side, the three frequency-divided outputs $R_2$, $R_4$, $R_8$, from the frequency-dividing circuit 13 at the read-out side are latched in response to frequency-divided outputs $W_2$ and $W_{2i}$ of positive and opposite phases, respectively, supplied by the frequency-dividing circuit 12 at the write side, which will be later described. Then, latched outputs $R_d$ and $R_{di}$ from latch circuits 8 and 9, respectively are supplied to a coincidence detecting circuit 6 at the write side.

The coincidence detecting circuit 6 generates a coincidence detecting signal $W_P$ during any period in which the latch output $R_d$ from the latch circuit 8 coincides with the latch output $R_{di}$ from the latch circuit 9, and the coincidence detecting signal $W_P$ is supplied to the write line address counter 4y. Further, during any period, in which the latch outputs $R_d$ and $R_{di}$ from the latch circuits 8 and 9 coincide with each other, the supply of the line address increment clock pulse $W_C$ from the write clock pulse generating circuit 3 to the write line address counter 4y is inhibited, whereby the writing of the digital reproduced video signal from the A/D converter 2 into the memory 5 is inhibited for one line period.

The frequency-dividing circuit 12 on the write side frequency-divides the clock pulse $W_C$ from the write clock pulse generating circuit 3 to provide ½- and ¼-frequency-divided signals $W_2$ and $W_4$, respectively, and then supplies these frequency-divided output signals $W_2$ and $W_4$, as data, to the latch circuits 10 and 11 at the read-out side. Also, the ½-frequency-divided output $W_2$ and an inverted frequency-divided output $W_{2i}$ of opposite phase are respectively supplied as latch pulses to the latch circuits 8 and 9 on the write side. In the latch circuits 10 and 11 at the read-out side, the two frequency-divided outputs $W_2$ and $W_4$ from the frequency-dividing circuit 12 at the write side are latched in response to the frequency-divided outputs $R_2$ and $R_{2i}$ of positive and opposite phases from the frequency-dividing circuit 13 at the read-out side. Latched outputs $W_d$ and $W_{di}$ from the latch circuits 10 and 11, respectively, are supplied to a coincidence detecting circuit 7 at the read-out. The coincidence detecting circuit 7 generates a coincidence detecting signal $R_p$ during any period in which the latched output $W_d$ from the latch circuit 10 coincides with the latched output $W_{di}$ from the latch circuit 11, and such coincidence detecting signal $R_p$ is supplied to the read line address counter 15y. Further, during any period in which the latched outputs $W_d$ and $W_{di}$ from the latch circuits 10 and 11 coincide with each other, the supply of the clock pulse $R_c$ from the read clock generating circuit 14 to the read line address counter 15y is inhibited and one line of the digital reproduced video signal is read out from the memory 5 twice.

An operation of the time base correcting apparatus of FIG. 6 will now be described with reference to FIGS. 7A–7J and FIGS. 8A–8I.

An operation in the reverse (REV) variable speed reproduction mode will be explained first. FIGS. 7A–7J are timing charts to which reference will be made in explaining how the writing of the digital reproduced video signal into the memory 5 is inhibited when a video signal reproduced in the reverse variable speed reproduction mode is supplied to the input terminal $T_1$.

Figures 7A, 7B, 7C:
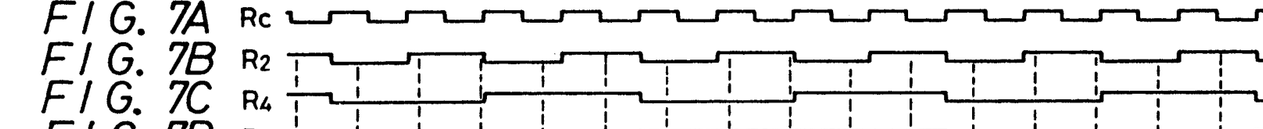
FIGS. 7A-7J are timing charts respectively used to explain an operation by which the writing of a reproduced digital video signal in a memory is removed, or inhibited, in the reverse variable speed reproduction mode.
Figures 7D, 7E, 7F, 7G, 7H, 7I:
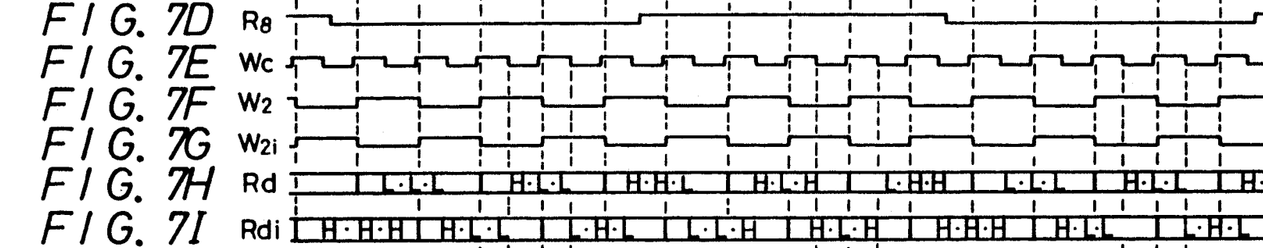

FIG. 7A shows the clock pulse $R_c$ which is supplied from the read clock generating circuit 14 to the frequency-dividing circuit 13 at the read-out side, and FIGS. 7B, 7C and 7D show the frequency-divided outputs $R_2$, $R_4$ and $R_8$ provided by the frequency-dividing circuit 13 and frequency-dividing the clock pulse $R_c$ by 2, 4 and 8, respectively. FIG. 7E shows the clock pulse $W_c$ from the write clock generating circuit 3, FIG. 7F shows the frequency-divided output $W_2$ provided by the frequency-dividing circuit 12 and which results from frequency-dividing the clock whose phase is opposite to that of the ½-frequency-divided output $W_2$.

The ½-, ¼- and ⅛-frequency-divided outputs $R_2$, $R_4$ and $R_8$ from the frequency-dividing circuit 13 at the read-out side are supplied to the latch circuits 8 and 9 at the write side, in which they are latched by the frequency-divided outputs $W_2$ and $W_{2i}$ supplied thereto as latch pulses of positive and opposite phases, respectively, from the frequency-dividing circuit 12 at the write side. Latched outputs $R_d$ and $R_{di}$ (FIGS. 7H and 7I) are then supplied to the coincidence detecting circuit 6. FIG. 7H shows a data arrangement of the 3-bit latch output $R_d$ of the ½-, ¼- and ⅛-frequency-divided signals $R_2$, $R_4$ and $R_8$ latched by the frequency-divided output $W_2$ of positive phase, and FIG. 7I shows a data arrangement of the 3-bit latch output $R_{di}$ of the ½-, ¼- and ⅛-frequency-divided signals $R_2$, $R_4$ and $R_8$ latched by the frequency-divided output $W_{2i}$ of opposite phase.

Figure 7J:
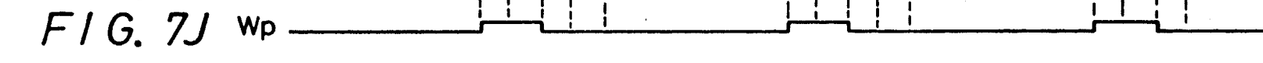

Upon detecting that the data arrangement of the two 3-bit latched outputs $R_d$ and $R_{di}$ are coincident with each other, the coincidence detecting circuit 6 generates the coincidence detecting signal $W_p$, shown in FIG. 7J, and this signal is fed to the write line address counter 4y. The write line address counter 4y inhibits the supply of the clock pulse $W_c$ thereto generated by the write clock pulse circuit 3 and holds the count value provided just before the period of coincidence in which the detecting signal $W_p$ "1" (high level), that is, the line address remains unchanged when the detecting signal $W_p$ from the coincidence detecting circuit 6 is at "1". When the detecting signal $W_p$ goes to "0" (low level), the counter 4y starts the counting of the clock pulse $W_c$ from the count value thus held, that is, from the line address at which counting was inhibited. Accordingly, during the period of coincidence in which the detecting signal $W_p$ is at "1", the writing in the memory 5 the digital reproduced video signal supplied from the A/D converter 2 is inhibited for one line period.

An operation in the forward (FWD) variable speed reproduction mode will now be described. FIGS. 8A–8I are timing charts to which reference will be made in explaining double reading, that is, the way in which the digital reproduced video signal written in the memory 5 may be read-out twice if a reproduced video signal reproduced in the forward variable speed reproduction mode is supplied to the input terminal $T_1$. FIG. 8A shows the clock pulse $W_c$ supplied form the write clock pulse generating circuit 3 to the frequency-dividing circuit 12, and FIGS. 8B and 8C show the frequency-divided outputs $W_2$ and $W_4$ provided by the frequency-dividing circuit 12 and which result from frequency-dividing circuit 12 and which result from frequency-dividing the clock pulse $W_c$ by 2 and 4, respectively. FIG. 8D shows the clock pulse $R_c$ from the read clock generating circuit 14, FIG. 8E. shows the frequency-divided output $R_2$ provided by the frequency-dividing circuit 13 and which results from frequency-dividing the clock pulse $R_c$ by 2, and FIG. 8F shows the frequency-divided output $R_{2i}$ whose phase is opposite to that of the ½-frequency-divided output $R_2$.

The ½- and ¼-frequency-divided outputs $W_2$ and $W_4$ from the frequency-dividing circuit 12 at the write side are supplied to the latch circuits 10 and 11 at the read-out side, in which they are latched by the frequency-divided outputs $R_2$ and $R_{2i}$ supplied thereto as latch pulses of positive and opposite phases, respectively, from the frequency-dividing circuit 13 at the read-out side. Latched outputs $W_d$ and $W_{di}$ of the latch circuits 10 and 11 are supplied to the coincidence detecting circuit 7. FIG. 8G shows a data arrangements of the 2-bit latched output $W_d$ of the ½- and ¼-frequency-divided signals $W_2$ and $W_4$, latched by the frequency-divided output $R_2$ of positive phase, and FIG. 8H shows a data arrangement of the 2-bit latch output $W_{di}$ of the ½- and ¼-frequency-divided signals $W_2$ and $W_4$, latched by the frequency-divided output $R_{2i}$ of opposite phase.

Figures 8A, 8B, 8C, 8D, 8E, 8F, 8G, 8H, 8I:
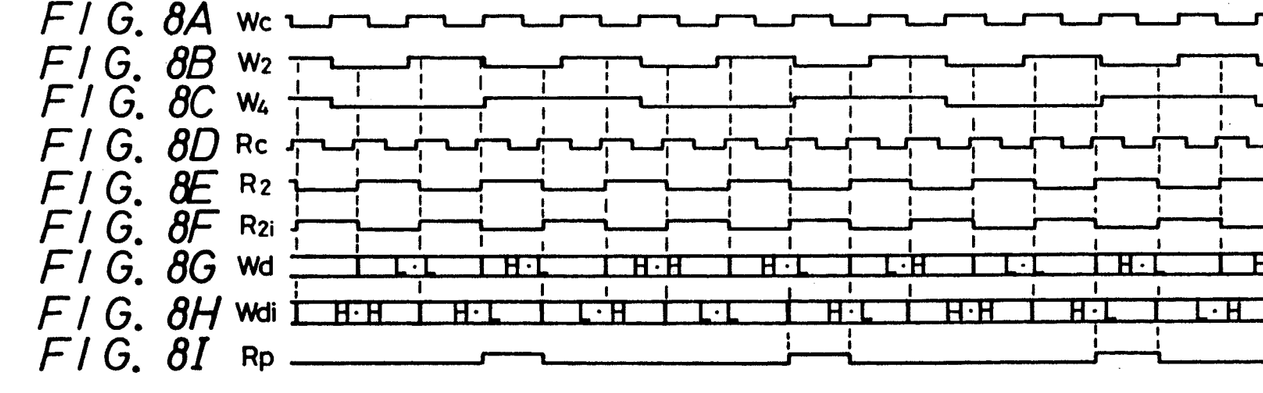
FIGS. 8A-8I are timing charts respectively used to explain an operation by which a reproduced digital video signal written in a memory is read out twice in the forward variable speed reproduction mode.

Upon detecting that the data arrangements of the two latched outputs $W_d$ and $W_{di}$ are coincident with each other, the coincidence detecting circuit 7 generates the coincidence detected signal $R_p$, shown in FIG. 8I, and this signal is supplied to the read linea ddress counter 15y. The read line address counter 15y inhibits the supply of the clock pulse $R_c$ thereto from the read clock generating circuit 14, and holds the count value provided just before the period of coincidence in which the detecting signal $R_p$ goes to "1", that is, the line address remains unchanged when the detected signal $R_p$ from the coincidence detecting circuit 7 is at "1". When the detected signal $R_p$ goes to "0", the counter 15y starts the counting of the clock pulse $R_c$ from the count value thus held, that is, from the line address at the time when counting of the pulse $R_c$ was inhibited. Therefore, during the period of coincidence in which the detected signal $R_p$ is at "1", one line of the digital reproduced video signal stored in the memory 5 is read out twice.

The range of the reproducing speed in which the occurrence of "picture contraction" or "picture expansion" can be avoided in the above-mentioned time base correcting apparatus is determined by the bit number of data used to detect the coincidence of addresses, that is, the output bit numbers of the frequency-dividing circuits 13 and 12. Here, assuming that m represents the output bit number of the frequency-dividing circuit 13 and n represents the output bit number of the frequency-dividing circuit 12, the range of the reproducing speed at which "picture contraction" or "picture expansion" can be avoided is within a range in which the cycle or interval of the reproduced horizontal synchronizing signal resulting from the reproducing speed is from $$\left(\frac{1}{2^n - 1}\right)$$

times to $(2^m - 1)$ times the cycle or interval of the reference horizontal synchronizing signal.

In this embodiment, since m=3 and n=2, the range of reproducing speed is that which causes the reproduced horizontal synchronizing signal interval to be from ⅓ to 7 times the reference horizontal synchronizing signal interval. The reproduction speed which provides the above relationship is approximately ±50 times the speed of the normal reproducing mode. Further, if the ratio of the cycle of the reproduced horizontal synchronizing signal to that of the reference horizontal synchronizing signal is small, the number of bits may be also small. Therefore, if the number of bits of the frequency-dividing circuits 12 and 13 is increased, the apparatus is equipped to handle variable speed reproduction at a speed higher than the above-mentioned tape running speed.

Although the above-described embodiment employs a component signal as the reproduced video signal, a composite can also be employed.

Having described a preferred embodiment of the invention with reference to the accompanying drawings, it is to be understood that the invention is not limited to that precis embodiment and that various changes and modifications thereof could be effected by one skilled in the art without departing from the spirit or scope of the novel concepts of the invention as defined in the appended claims.

We claim as our invention:

1. Apparatus for use in a time base corrector of the type having memory means for storing and reading out a reproduced video signal reproduced by a rotary magnetic head from slant tracks on a magnetic tape which is transported at a desired tape running speed that may be different from a tape running speed used when recording said video signal on said tape, a write in-line address counter for generating a write in-line address signal supplied to said memory means, a write line address counter for generating a write line address signal also supplied to said memory means, means for providing a reproduced horizontal synchronizing signal from said reproduced video signal, a write clock signal generating circuit for generating a write in-line address increment clock signal and a write line address increment clock signal which are each synchronized with said reproduced horizontal synchronizing signal and which are supplied to said write in-line address counter and said write line address counter, respectively, a read in-line address counter for generating a read in-line address signal supplied to said memory means, a read line address counter for generating a read line address signal also supplied to said memory means, and a read clock signal generating circuit supplied with a reference horizontal synchronizing signal for generating a read in-line address increment clock signal and a read line address increment clock signal which are each synchronized with said reference horizontal synchornizing signal and which are supplied to said read in-line address counter and to said read line address counter, respectively, the combination comprising:

means for generating first and second pairs of periodically recurring signal sequences derived form said reproduced horizontal synchronizing signal and said reference horizontal synchronizing signal, respectively;

detecting means for providing a first detected output when respective signals from said first pair of sequences coincide and for providing a second detected output when respective signals from said second pair of sequences coincide; and control means for inhibiting a change of said read line address signal from said read line address counter in response to said first detected output from said detecting means and for inhibiting a change of said write line address signal from said write line address counter in response to said second detected output from said detecting means.

2. The apparatus as in claim 1, wherein said means for generating first and second pairs of periodically recurring signal sequences includes first frequency dividing means for frequency-dividing said write line address increment clock signal and thereby providing a plurality of first frequency-divided signals including a ½-frequency-divided signal and also providing an inverter ½-frequency-divided signal, second frequency dividing means for frequency-dividing said read line address increment clock signal and thereby providing a plurality of second frequency-divided signal and also providing an inverted ½-frequency-divided signals including a ½-frequency-divided signal, first latch means for latching said second frequency-divided signals on the basis of said ½-frequency-divided signal provided by said first frequency dividing means, second latch means for latching said second frequency-divided signals on the basis of said inverter ½-frequency-divided signal provided by said first frequency dividing means, third latch means for latching said first frequency-divided signals on the basis of said ½-frequency-divided signal provided by said second frequency dividing means, and fourth latch means for latching said first frequency-divided signals on the basis of said inverter ½-frequency-divided signal provided by said second frequency dividing means; and wherein said detecting means includes first coincidence detecting means for detecting coincidence between etected outputs of said first and second latch means, and second coincidence detecting means for detecting coincidence between detected outputs of said third and fourth latch means.

3. The apparatus as in claim 2, wherein said control means inhibits said write line address counter from responding to the write line address increment clock signal in response to the detection bys aid first coincidence detecting means of said coincidence between said outputs of said first and second latch means and also inhibits said read linea ddress counter from responding to the read line address increment clock signal in response to the detection by said second coincidence etecting means fo said coincidence between said outputs of said third and fourth latch means.

* * * * *